(12) United States Patent
Dierks, Jr. et al.

(10) Patent No.: US 7,818,433 B2
(45) Date of Patent: Oct. 19, 2010

(54) SYSTEM AND METHOD FOR MINIMIZING RETRY DELAYS IN HIGH TRAFFIC COMPUTER NETWORKS

(75) Inventors: Herman Dietrich Dierks, Jr., Round Rock, TX (US); Jose Raul Escalera, Austin, TX (US); Kiet H. Lam, Old Round Rock, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 11/839,955

(22) Filed: Aug. 16, 2007

(65) Prior Publication Data

US 2009/0049178 A1 Feb. 19, 2009

(51) Int. Cl.
G06F 15/16 (2006.01)
H04L 1/00 (2006.01)
H01H 67/00 (2006.01)

(52) U.S. Cl. .................. 709/227; 709/228; 709/229; 340/825.01; 340/825.02

(58) Field of Classification Search ......... 709/227–229; 340/825.01–825.04
See application file for complete search history.

(56) References Cited

U.S. PATENT DOCUMENTS 7,174,386 B2   2/2007   Cunningham et al. ....... 709/234

OTHER PUBLICATIONS

W. Richard Stevens, TCP/IP Illustrated, vol. 1: The Protocols, Dec. 31, 1993, Addison-Wesley Professional, Chapter 18.*
W. Richard Stevens, Gary R. Wright, TCP/IP Illustrated, vol. 2: The Implementation, Jan. 31, 1995, Addison-Wesley Professional, Chapter 28.*
T. Faber et al., The Time-Wait state in TCP and Its Effect on Busy Servers, 1999, IEEE INFOCOMM.*

* cited by examiner

Primary Examiner—William C Vaughn, Jr.
Assistant Examiner—Carlos R Perez Toro
(74) Attorney, Agent, or Firm—VanLeeuwen & VanLeeuwen; David A. Mims, Jr.

(57) ABSTRACT

A system, method, and program product is provided that requests, by a first computer system, a new network session with a second computer system. The new network session request occurs after a previous network session between the two systems and the new network session request includes a new sequence number that is different from a previous sequence number that was used during the previous network session. The first computer system receives an acknowledgement from the second computer system that references the previous sequence number instead of the new sequence number. In response to receiving the acknowledgement at the first computer system that references the previous sequence number, the first computer system modifies the new sequence number by setting it to a value that is higher than the previous sequence number, and the first computer system re-requests the new network session using the modified new sequence number.

11 Claims, 5 Drawing Sheets

SYSTEM AND METHOD FOR MINIMIZING RETRY DELAYS IN HIGH TRAFFIC COMPUTER NETWORKS

BACKGROUND OF THE INVENTION

1. Technical Field

The present invention relates to a system and method that minimizes retry delays in high traffic computer networks. More particularly, the present invention relates to a system and method that modifies sequence numbers used to request a new session so that the modified sequence number is greater than a previous sequence number.

2. Description of the Related Art

Many computer systems used in high-speed networks open and close numerous network connections (sessions) when communicating over a network with a particular computer system. For example, a client computer system may repeatedly open and close sessions with a particular server computer system. In some conditions, as will be described herein, the request for a new session is identified by the server as a packet belonging to the previous session, rather than a new session request.

Figure 3:
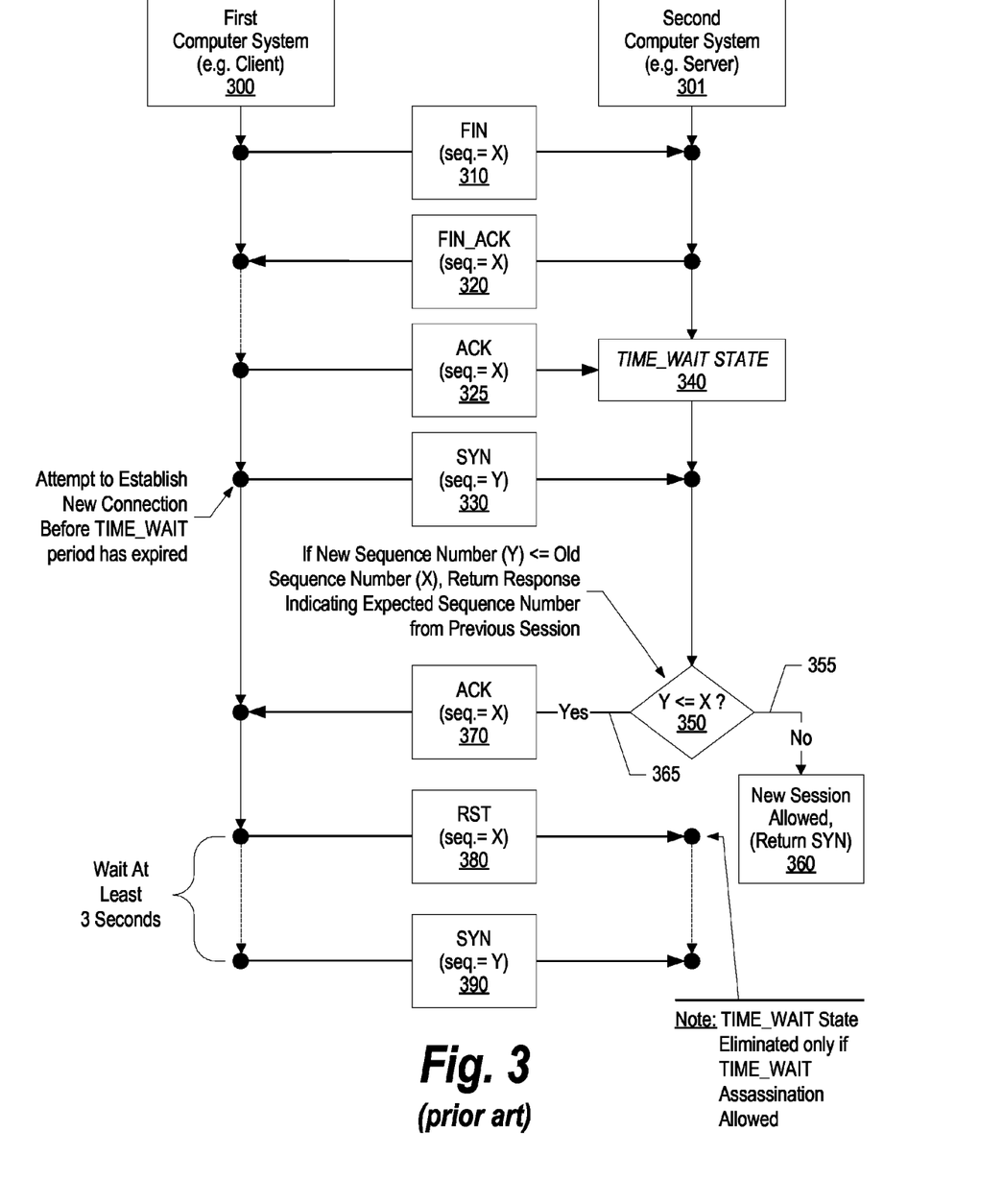
FIG. 3 is a diagram depicting traditional (prior art) handling of a new session request with a new sequence number that is less than a previously used sequence number resulting in delays in establishing the new session.

When this condition occurs, timeouts in the current TCP protocol results in delays and, consequently, poor performance. FIG. 3 depicts a prior art example of this condition occurring and the resulting delays. First computer system 300 and second computer system 301 are shown communicating using a protocol, such as the TCP protocol. First computer system 300 is often a client computer system and second computer system 301 is often a server computer system, however the types of systems involved is irrelevant so long as the first computer system and the second computer system are communicating over a network using a protocol such as the TCP protocol.

First computer system 300 sends request 310 to terminate a previous network session. In the TCP protocol, the termination request is a FIN request. The termination request uses a sequence number that is used for the previous session, and is depicted as "X, in the figures. While "X" is used repeatedly, it will be understood by those skilled in the art that "X" represents a series of sequence numbers that extends from an initial base sequence number. The sequence numbers assist the computer system in determining the order of packets so that a packet that takes more time to travel through the network and arrives out of order is able to be processed correctly. The second computer system responds with packet 320 that acknowledges the terminate request. Again, in the TCP protocol, the termination acknowledgement is a FIN_ACK response. First computer system 300 sends acknowledgement (ACK) packet 325 that acknowledges receipt of the FIN_ACK packet from the second computer system. When the second computer system receives the last ACK, the second computer system enters "time wait" state 340 (TIME_WAIT) that is generally used to clean up any packets from the previous session that was just terminated. The time wait state varies from one system to another. Generally, the TIME_WAIT state is dependent on the operating system being used.

In many situations, first computer system 300 requests a new session with second computer system 301 before the time wait period has expired. This new session request is accomplished when sync (SYN) packet 330 is sent from first computer system 300 to second computer system. The new session request has a different sequence number. The new series of sequence numbers, represented as "Y", is different from the old series of sequence numbers (X) that was used with the previous session. A common approach to creating the new sequence number (Y) is using a random number generator. If the new sequence number (Y) is less than or equal to the sequence number that was used with the previous session (X), than the second computer system will consider the new request (SYN request 330) to be part of the previous session and not a request to establish a new session. This is represented by decision block 350. If the new sequence number is greater than the previous sequence number, then decision 350 branches to "no" branch 355 whereupon, at step 360, a new session is established using the new sequence number as the base sequence number.

On the other hand, if the new sequence number is less than or equal to the previous sequence number, then decision 350 branches to "yes" branch 365 whereupon the second computer system returns an acknowledgement (ACK) response 370 with the sequence number that was expected (X) and the second computer system does not establish a new session. In traditional systems, the acknowledgement (ACK) is received by the first computer system which responds by (1) sending a reset (RST) request 380 to the second computer system, (2) waiting at least three seconds to ensure that the second computer system's TIME_WAIT state has cleared, and (3) re-requesting the new session by sending sync (SYN) request 390 after the three second period has expired. Note that the second computer system may be configured to allow TIME_WAIT assassination, in which case the TIME_WAIT state is eliminated upon the second computer system's receipt of reset (RST) request 380. As can be seen, with systems that are repeatedly establishing new sessions amongst each other, frequently encountering the three second delay in order to re-request the new session can be quite challenging resulting in reduced network throughput and slower overall system performance.

SUMMARY

It has been discovered that the aforementioned challenges are resolved using a system, method and computer program product that requests, by a first computer system, a new network session with a second computer system. The new network session request occurs after a previous network session between the two systems and the new network session request includes a new sequence number that is different from a previous sequence number that was used during the previous network session. The first computer system receives an acknowledgement from the second computer system that references the previous sequence number instead of the new sequence number. In response to receiving the acknowledgement at the first computer system that references the previous sequence number, the first computer system modifies the new sequence number by setting it to a value that is higher than the previous sequence number, and the first computer system re-requests the new network session using the modified new sequence number.

In one embodiment, prior to requesting the new network session, a finish request (FIN) is sent from the first computer system to the second computer system in order to terminate the previous network session. The requesting of the new network session is performed after the first computer system receives a responsive finish acknowledgement (FIN_ACK) from the second computer system.

In a further embodiment, the requesting of the new network session is performed by sending a sync request (SYN) from the first computer system to the second computer system. The sync request is sent before a time wait (TIME_WAIT) period has expired on the second computer system.

In a still further embodiment, the re-requesting of the new session is performed by resetting the previous network session by sending a reset (RST) request from the first computer system to the second computer system. The reset request references the previous sequence number. The first computer system then sends a second sync request (SYN) with the second sync request referencing the new sequence number after it has been modified to be a value greater than the previous sequence number. In one embodiment, the new sequence number is modified by adding a random number to the previous sequence number.

In a further embodiment, the second sync request is sent before a time out value on the second computer system has expired. In one implementation, the time out value is a three second period of time.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
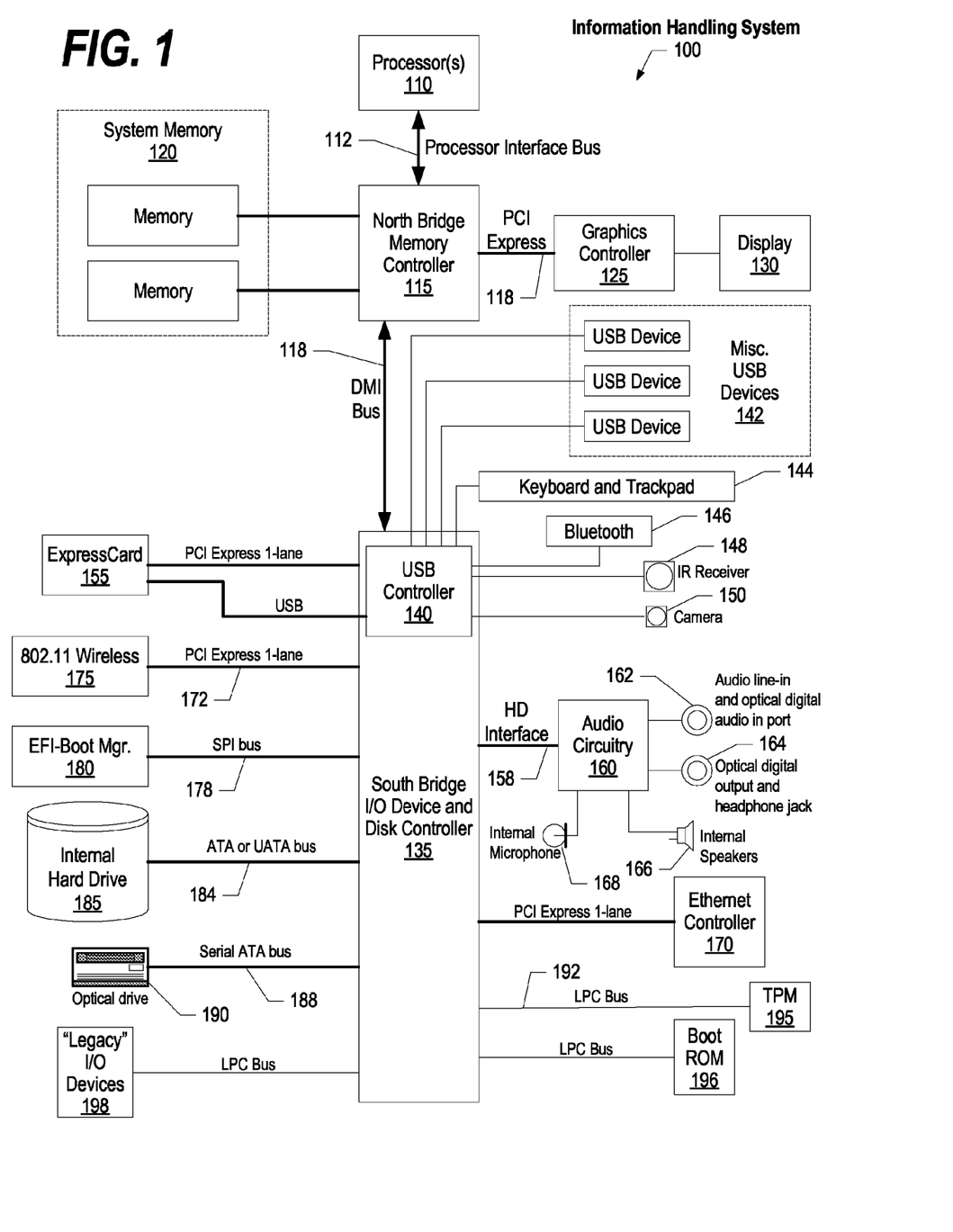
FIG. 1 is a block diagram of a data processing system in which the methods described herein can be implemented.
Figure 2:
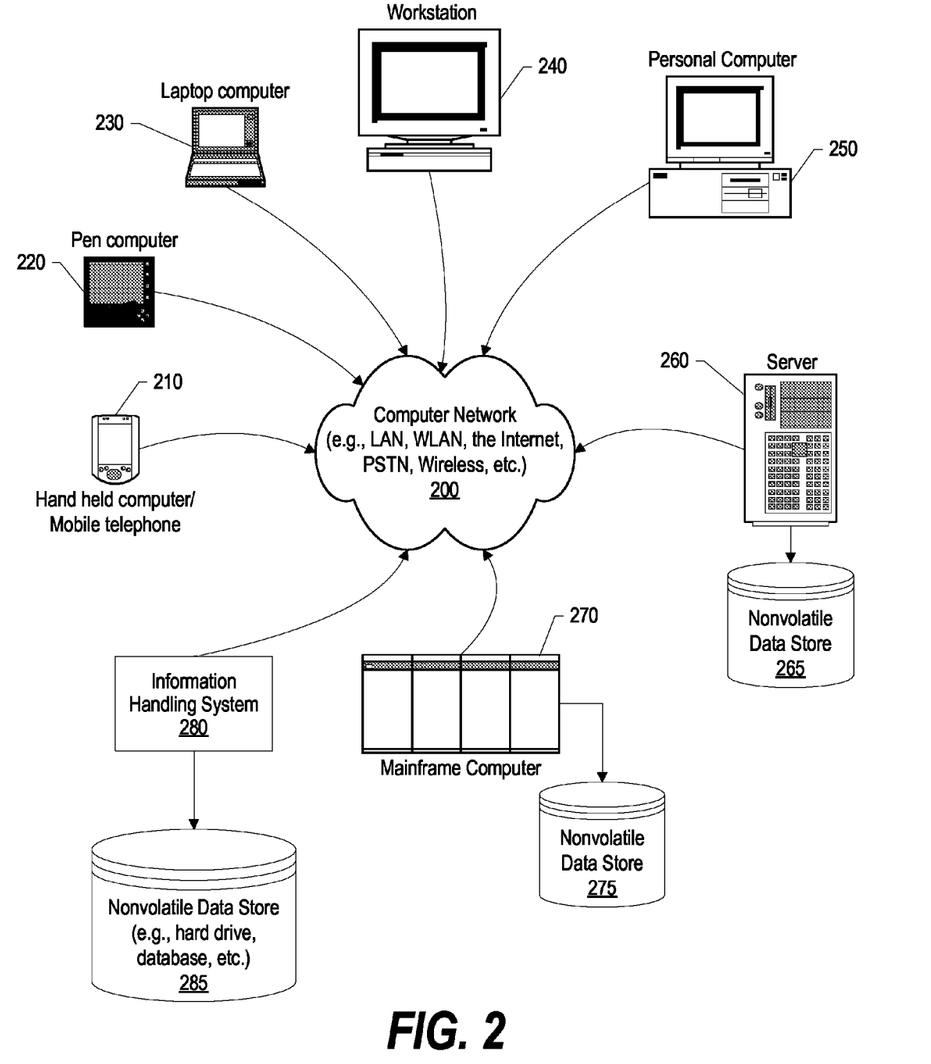
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 118. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera1) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

FIG. 3 is a diagram depicting traditional (prior art) handling of a new session request with a new sequence number that is less than a previously used sequence number resulting in delays in establishing the new session. FIG. 3 is described in the Background Section, above.

Figure 4:
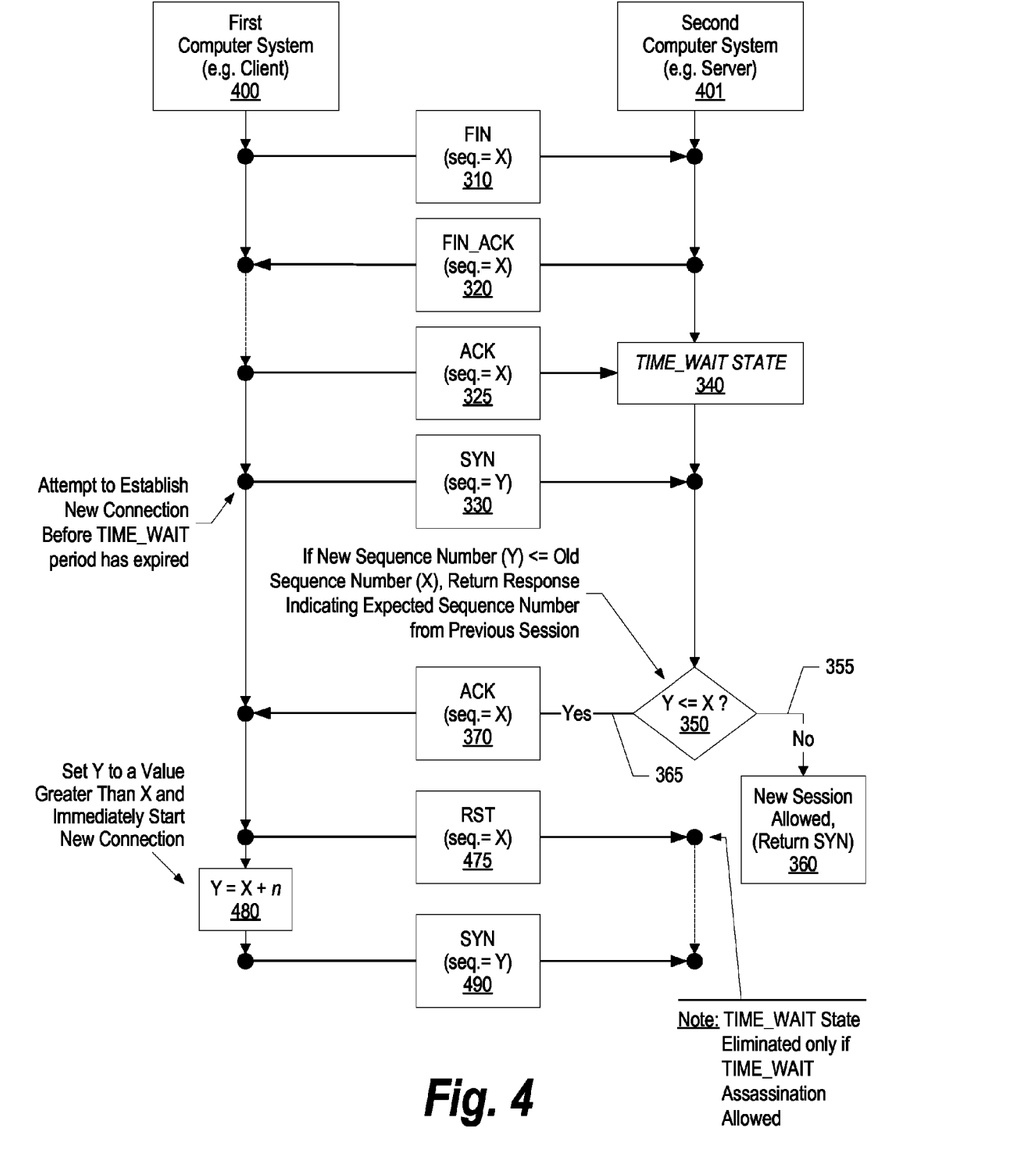
FIG. 4 is a diagram depicting improved handling of the new session request with a new sequence number that is less than a previously used sequence number that reduces the delays encountered to establish the new session.

FIG. 4 is a diagram depicting improved handling of the new session request with a new sequence number that is less than a previously used sequence number that reduces delays encountered to establish the new session. The initial steps that take place are substantially similar to the steps that are shown and described in FIG. 3. Requests, steps and responses 310 through 370 are the same between FIG. 3 and FIG. 4. However, in FIG. 4, the first computer system responds differently when it receives acknowledgement (ACK) response 370 that references the sequence number that was used with the previous session. Instead of waiting for the three second period, the first computer system responds to the reception of ACK response 370 by (1) sending reset (RST) request 475 that references the sequence number (X) that was used in the previous session. However, now instead of waiting for a period of time (e.g., three seconds) before re-requesting the new session, the first computer system, at step 480, modifies the new sequence number to ensure that it is greater than the sequence number that was used with the previous session. In one embodiment, the new sequence number is modified by adding the previous sequence number (X) to a random number to provide the new sequence number. In another embodiment, the new sequence number is obtained by adding a value, such as the window size (Win Size) to the previous sequence number. In a further embodiment, the window size (Win Size) is added to the previous sequence number along with a constant (e.g., 1) or a random number to provide the new sequence number.

In any event, after being modified, the new sequence number is greater than the previous sequence number. The new session is then re-requested by sending another sync (SYN) request 490 from the first computer system to the second computer system. Now, the new sequence number is greater than the previous sequence number, so the second computer system will allow the new session and not inadvertently return a response referencing the previous sequence number. In other words, when the second computer system re-performs decision 350, the new sequence number (Y) will be greater than the previous sequence number (X), causing decision 350 to branch to "no" branch 355 and allow the new session at 460 by returning a responsive sync (SYN) response to the first computer system.

Figure 5:
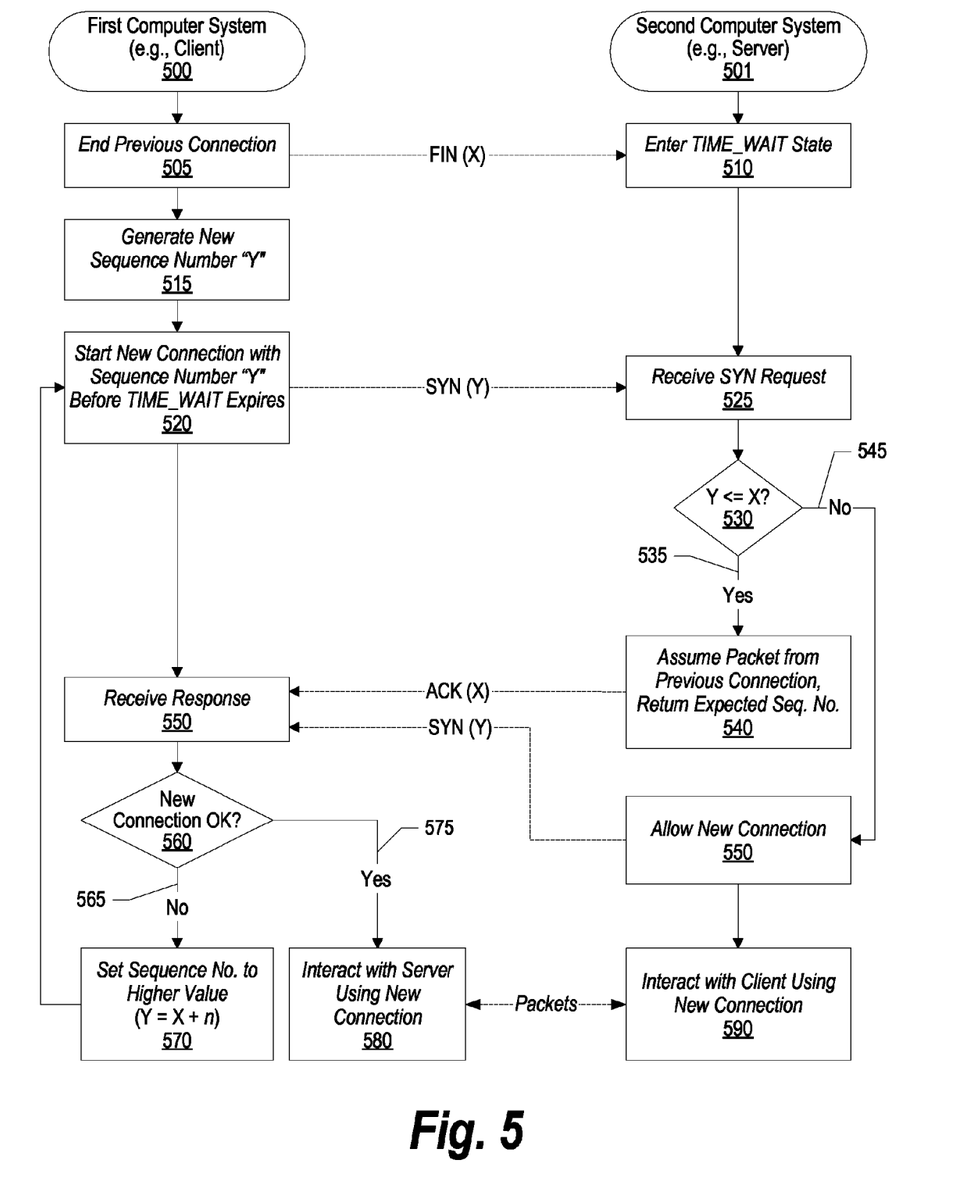
FIG. 5 is a flowchart showing steps performed by a requestor (e.g., a client) and a receiver (e.g., a server) in establishing new a new session with minimal delays after termination of a previous connection.

FIG. 5 is a flowchart showing steps performed by a requester (e.g., a client) and a receiver (e.g., a server) in establishing new a new session with minimal delays after termination of a previous connection. Processing performed by the first computer system (e.g., a client) is shown commencing at 500 and processing performed by the second computer system (e.g., a server) is shown commencing at 501. At step 505, the first computer system ends the previous session by sending a command (e.g., finish or "FIN") to the second computer system. It will be appreciated by those skilled in the art that only some request and response packets are shown to illustrate and highlight the handling of the new connection (e.g., the FIN_ACK response is not shown, etc.). At step 510, the second computer system enters a TIME_WAIT state. The amount of time that the second computer system remains in the TIME_WAIT state may vary from one system to another based on the particular operating system being used by the computer system.

Returning to processing by the first computer system, at step 515 the first computer system generates a new sequence number "Y." The new sequence number can be generated in any number of ways, but often uses a random number generator to generate the sequence number. Before the TIME_WAIT period has expired, at step 520, the first computer system sends a request to start a new session with the second computer system using the new sequence number (Y).

Returning to processing performed by the second computer system, at step 525, the second computer system receives the new session (SYN) request along with the new sequence number (Y). A determination is made by the second computer system as to whether the new sequence number is less than or equal to the sequence number that was used with the previous session (decision 530). If the new sequence number (Y) is less than or equal to the previously used sequence number (X), then decision 530 branches to "yes" branch 535 whereupon, at step 540, the second computer system assumes that the SYN packet belongs with the previous session and the second computer system returns an acknowledgement (ACK) that indicates the expected sequence number (X) for the previous session. On the other hand, if the new sequence number (Y) is greater than the previously used sequence number (X), then decision 530 branches to "no" branch 545 whereupon, at step 550, the new session is allowed with the second computer system sending a responsive sync (SYN) back to the first computer system and, at step 590, the second computer system interacts with the first computer system using the new session with packets transmitted between the two computer systems that reference the new sequence number (Y).

Returning to processing performed by the first computer system, at step 550 a response is received to the first computer system's new connection request. The response is either an acknowledgement (ACK) response that references the previous session, or a sync (SYN) response that acknowledges the new session. A determination is made by the first computer system as to whether the new session was created successfully (decision 560). In other words, whether a sync (SYN) response is received. If the new session was not successfully created, then decision 560 branches to "no" branch 565 whereupon, at step 570, the first computer system sets the new sequence number to a value that is higher than the sequence number that was used with the previous session (Y=X+n, where n is a value greater than zero). Processing then loops back to step 520 to re-request the new session, now with a modified new sequence number that is greater than the sequence number used by the previous session. This time the determination made by the second computer system (decision 530) is guaranteed to be false and branch to "no" branch 545 and allow the new connection at step 550 because the new sequence number (Y) will be greater than the sequence number used by the previous session (X).

Returning to decision 560, when the response received from the second computer system indicates that the new session is allowed, then decision 560 branches to "yes" branch 575 whereupon, at step 580 the first computer system interacts with the second computer system using the new session and the new sequence number. This will either occur (1) when the initial request is made at step 520 if the new sequence number happens to be greater than the previous sequence number, or (2) after the new sequence number has been modified to ensure that it is greater than the previous sequence number and the new session is re-requested (e.g., step 570 looping back to step 520).

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), a non-transitory computer readable media, or any other computer-readable media. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   sending, by a first computer system to a second computer system, a finish request (FIN) in order to terminate a previous network session;
   in response to the sending, receiving, by the first computer system, a responsive finish acknowledgement (FIN ACK) from the second computer system;

in response to receiving the responsive finish acknowledgement, requesting, by the first computer system, a new network session with the second computer system, wherein the new network session request occurs after the previous network session between the first computer system and the second computer system, and wherein the new network session request includes a new sequence number that is different from a previous sequence number that was used during the previous network session, and wherein the requesting is performed by sending a sync request (SYN) from the first computer system to the second computer system before a time wait (TIME_WAIT) period has expired on the second computer system;

receiving, at the first computer system, an acknowledgement from the second computer system that references the previous sequence number instead of the new sequence number;

in response to receiving the acknowledgement at the first computer system that references the previous sequence number:

modifying the new sequence number by setting it to a value that is higher than the previous sequence number; and re-requesting, by the first computer system, the new network session with the second computer system using the modified new sequence number.

2. The method of claim 1 wherein the modified new sequence number is obtained by adding a random number to the previous sequence number.

3. The method of claim 1 wherein the time out value is a three second period of time.

4. A first information handling system comprising:

one or more processors;

a computer readable non-transitory memory accessible by at least one of the processors;

a nonvolatile storage area accessible by at least one of the processors;

a network interface adapter that connects the information handling system to a computer network that allows the first information handling system to communicate with a second information handling system;

a set of instructions executed by one or more of the processors in order to perform actions of:

sending, by a first computer system to a second computer system, a finish request (FIN) in order to terminate a previous network session;

in response to the sending, receiving, by the first computer system, a responsive finish acknowledgement (FIN_ACK) from the second computer system;

in response to receiving the responsive finish acknowledgement, requesting, by the first computer system, a new network session with the second computer system, wherein the new network session request occurs after the previous network session between the first computer system and the second computer system, and wherein the new network session request includes a new sequence number that is different from a previous sequence number that was used during the previous network session, and wherein the requesting is performed by sending a sync request (SYN) from the first computer system to the second computer system before a time wait (TIME_WAIT) period has expired on the second computer system;

receiving, at the first computer system, an acknowledgement from the second computer system that references the previous sequence number instead of the new sequence number;

in response to receiving the acknowledgement at the first computer system that references the previous sequence number:

modifying the new sequence number by setting it to a value that is higher than the previous sequence number; and re-requesting, by the first computer system, the new network session with the second computer system using the modified new sequence number.

5. The information handling system of claim 4 wherein the modified new sequence number is obtained by adding a random number to the previous sequence number.

6. The information handling system of claim 4 wherein the time out value is a three second period of time.

7. A computer program product stored in a computer readable non-transitory medium, comprising functional descriptive material that, when executed by an information handling system, causes the information handling system to perform actions that include:

sending, by a first computer system to a second computer system, a finish request (FIN) in order to terminate a previous network session;

in response to the sending, receiving, by the first computer system, a responsive finish acknowledgement (FIN_ACK) from the second computer system;

in response to receiving the responsive finish acknowledgement, requesting, by the first computer system, a new network session with the second computer system, wherein the new network session request occurs after the previous network session between the first computer system and the second computer system, and wherein the new network session request includes a new sequence number that is different from a previous sequence number that was used during the previous network session, and wherein the requesting is performed by sending a sync request (SYN) from the first computer system to the second computer system before a time wait (TIME_WAIT) period has expired on the second computer system;

receiving, at the first computer system, an acknowledgement from the second computer system that references the previous sequence number instead of the new sequence number;

in response to receiving the acknowledgement at the first computer system that references the previous sequence number:

modifying the new sequence number by setting it to a value that is higher than the previous sequence number, wherein the modified new sequence number is obtained by adding a random number to the previous sequence number; and re-requesting, by the first computer system, the new network session with the second computer system using the modified new sequence number.

8. The computer program product of claim 7 wherein the functional descriptive material that performs the re-requesting causes further actions comprising:

resetting the previous network session by sending a reset (RST) request from the first computer system to the second computer system, wherein the reset request references the previous sequence number; and sending a second sync request (SYN) from the first computer system to the second computer system, wherein the second sync request references the modified new sequence number.

9. The computer program product of claim 8 wherein the second sync request is sent before a three second time out value on the first computer system has expired.

10. The method of claim 1 wherein the re-requesting further comprises:
resetting the previous network session by sending a reset (RST) request from the first computer system to the second computer system, wherein the reset request references the previous sequence number; and
sending a second sync request (SYN) from the first computer system to the second computer system, wherein the second sync request references the modified new sequence number, and wherein the second sync request is sent before a time out value on the first computer system has expired.

11. The information handling system of claim 4 wherein the re-requesting further comprises:
resetting the previous network session by sending a reset (RST) request from the first computer system to the second computer system, wherein the reset request references the previous sequence number; and
sending a second sync request (SYN) from the first computer system to the second computer system, wherein the second sync request references the modified new sequence number, and wherein the second sync request is sent before a time out value on the first computer system has expired.

* * * * *